United States Patent Office 3,114,753
Patented Dec. 17, 1963

3,114,753
PROCESS FOR THE MANUFACTURE OF SPIRO-CYCLIC POLYKETONES
Arnold Brossi, Riehen, Max Gerecke, Basel, and Emilio Kyburz, Riehen, Switzerland, assignors to Hoffmann-La Roche Inc., Nutley, N.J., a corporation of New Jersey
No Drawing. Filed June 22, 1960, Ser. No. 37,827
Claims priority, application Switzerland June 25, 1959
17 Claims. (Cl. 260—346.2)

This invention relates to a process for the manufacture of spirocyclic polyketones, especially spirocyclic triketones of the general formula

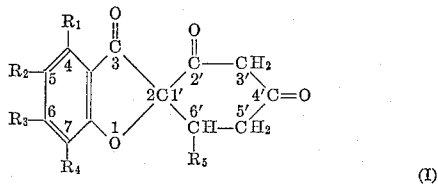

(I)

wherein $R_1$, $R_2$, $R_3$ and $R_4$ each represents hydrogen alkyl, alkoxy, hydroxy, nitro or halogen, and $R_5$ represents hydrogen or lower alkyl, and enol ethers and enol esters thereof.

The method of this invention comprises adding to a 2-carbalkoxycoumaran-3-one of the general formula

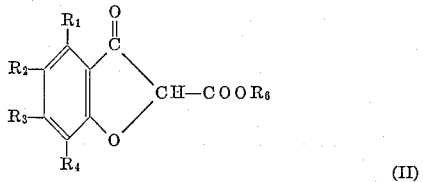

(II)

wherein $R_1$ to $R_4$ have the same meaning as above and $R_6$ represents lower alkyl, an alkenyl methyl ketone of the general formula

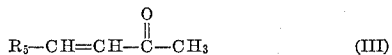

(III)

wherein $R_5$ has the same meaning as above, cyclizing the resulting addition product and then, if desired, converting the resulting spirocyclic polyketone of the general formula I into its enol ether or enol ester.

In the above formulas, the alkyl groups are preferably lower alkyl groups such as methyl, ethyl, propyl, isopropyl, butyl or isobutyl, or straight or branched chain hexyl groups. The alkoxy groups represent preferably lower alkoxy groups, for example, methoxy, ethoxy, propoxy or butoxy. The halogens may be fluorine, chlorine, bromine or iodine.

The 2-carbalkoxycoumaran-3-one of Formula II used as starting material are in part known compounds which may be produced, for example, by first esterifying salicylic acid or an aromatic ring substituted salicylic acid such as 2-hydroxy-4,6-dimethoxybenzoic acid, 2-hydroxy-3-methyl-4,6-dimethoxybenzoic acid, 2-hydroxy-3-chloro-4,6-dimethoxybenzoic acid 2-hydroxy-3,5-dichloro-4,6-dimethoxybenzoic acid, 2-hydroxy-3-nitro-4,6-dimethoxybenzoic acid or 2-hydroxy-3,6-dimethyl-4-methoxybenzoic acid, then in the presence of an alkaline condensation agent, treating the ester with a haloacetic acid ester, and finally cyclizing the resulting diester by the method of Dieckmann [see R. C. Elderfield, Heterocyclic Compounds (New York, 1951), vol. II, page 26].

Alkenyl methyl ketones which may be used to react with the 2-carbalkoxycoumaran-3-ones of Formula II are lower alkenyl-lower alkyl ketones such as methyl vinyl ketone, propenyl methyl ketone, butenyl methyl ketone, etc.

The first step of the method of this invention is preferably effected in alkaline medium, for example in the presence of piperdine, alkali alcoholate, e.g. alkali metal alkanolates such as sodium methylate, sodium ethylate or potassium methylate, or benzyl-trimethyl-ammonium hydroxide, etc., especially the last. It is further advantageous to use an organic solvent, for example an alkanol such as methanol, ethanol, etc., or a cyclic ether such as dioxane or tetrahydrofuran.

The addition product resulting from the above reaction may be represented by the following formula:

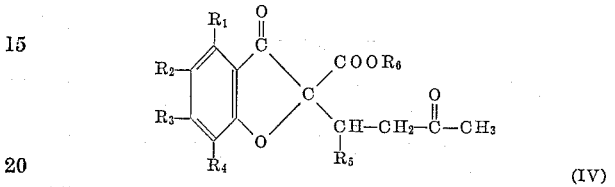

(IV)

All symbols in Formula IV have the significane already defined previously.

In the second step of this method, the addition product of Formula IV is cyclized. A preferred modification comprises effecting the cyclization in a solvent such as methanol, ethanol, benzene, dioxane etc., through the action of an alkaline condensation medium preferably at room temperature and under an atmosphere of nitrogen. Condensation agents which may be used include alkali metals such as potassium, lithium or sodium. There may also be used alkali metal alcoholates, e.g. sodium alcoholates such as sodium ethylate or especially sodium methylate. Alkali metal hydrides, for example, sodium hydride, constitute another useful class of condensation agents.

By using an alkaline condensation agent which not only promotes the cyclization but which also permits the addition reaction to occur, it is possible to carry out the method of this invention without isolating the addition product. According to this preferred method of operation, the end compound of Formula I may be directly obtained from the starting materials. Sodium methylate in methanol solution is particularly good for this purpose.

The spirocyclic polyketones produced are acid compounds having the general Formula I. They may be freed from aqueous solutions of their alkali salts by the addition of acids such as acetic acid, hydrochloric acid etc. Both the addition product of Formula IV as well as the spirocyclic polyketones of Formula I have at least one asymmetric carbon atom. When the symbol $R_5$ in Formula I or IV represents a lower alkyl group, there are two asymmetric centers and therefore two stereoisomeric racemates may be expected. The foregoing invention includes the preparation of both isomeric racemates which may be separated before or after the cyclization, for example by fractional crystallization or chromatography on aluminum oxide.

The spirocyclic polyketones may, if desired, be treated with alkylating agents such as diazomethane, dimethyl-sulfate, etc., or with acylating agents, such as acetic anhydride, propionic anhydride, etc., to obtain respectively the mono-enol ether or mono-enol ester wherein the ether or ester group is in the 2'- or 4'-position. Usually this reaction results in a mixture of two position isomers which may be separated, for example by fractional crystallization or by chromatography on aluminum oxide.

2',3'-enol ethers or 2',3'-enol esters of spirocyclic polyketones of Formula I, wherein $R_5$ represents a lower alkyl group, exist in two epimeric racemates. The process of the invention yields a mixture of these two racemates with one racemate in excess over the other. By epimerizing this mixture in the presence of an alkaline agent, e.g. an alkali metal amide, such as sodium amide, or an alkali metal alcoholate, whereby sodium methylate is the preferred one, there is obtained an epimerization mixture containing the two racemates in approximately equal proportions. These two racemates may be separated, for example by fractional crystallization or by chromatography on aluminum oxide.

The spirocyclic polyketones and their enol ethers and enol esters prepared according to the process of the invention exhibit chemotherapeutic properties and are intended to be used as medicaments and as intermediates in the synthesis of medicaments. Some representatives of this class of compounds show pronounced antimycotic properties.

The following examples serve to illustrate the invention. Temperatures in the examples are expressed in degree centigrade.

*Example 1*

10 g. of 2-carbomethoxy-4,6-dimethoxycoumaran-3-one (prepared according to the method of the J. Chem. Soc. 1954, page 434) were dissolved in 150 ml. of methanol while warming slightly. The solution was then cooled to 25°, 4 ml. of a 35% solution of benzyl-trimethyl-ammonium hydroxide were added, then 3.26 ml. of methyl vinyl ketone were dropped in with stirring and cooling. Crystals soon began to precipitate from the solution. After standing for 4 hours at room temperature, it was cooled and then filtered. There were obtained 9.7 g. of 2-carbomethoxy-2-(3-oxo-n-butyl)-4,6 - dimethoxycoumaran-3-one; M.P. 117–119°. The U.V. spectrum in industrial alcohol showed maxima at 209 m$\mu$ and 287 m$\mu$ ($\epsilon=21,500$ and $22,600$) and at 320 m$\mu$ (shoulder), $\epsilon=4,700$.

7.5 g. of the addition product were cyclized by dissolving in 80 ml. of absolute methanol, and after cooling to 25°, 23.3 ml. of 1 N sodium methylate in methanol were added. After standing for 40 hours at room temperature under a nitrogen atmosphere, the reaction solution was concentrated under water vacuum, diluted with water and freed of insoluble byproducts by extraction with benzene. The aqueous phase was separated and decolorized with carbon, filtered and made acid to congo red with hydrochloric acid. The precipitated 4,6-dimethoxygrisan-3,2',4'-trione was filtered off, washed with water and dried. After redissolving and crystallizing from ethyl acetate, the product melted at 204–206°; yield: 1.4 g. The U.V. spectrum in industrial alcohol showed maxima at 210 m$\mu$ and 283 m$\mu$ ($\epsilon=23,300$ and $31,400$) and at 320 m$\mu$ (shoulder), $\epsilon=5,000$. The U.V. spectrum in alcoholic 0.01 N sodium hydroxide solution showed a maximum at 286 m$\mu$ ($\epsilon=50,000$), and at 320 m$\mu$ (shoulder), $\epsilon=6,500$.

*Example 2*

1 g. of 2-carbethoxy-2-(3-oxo-n-butyl)-4,6-dimethoxycoumaran-3-one (M.P. 90–92°, prepared from 2-carbethoxy-4,6-dimethoxycoumaran-3-one and methyl vinyl ketone in the same manner described in Example 1 and J. Chem. Soc. 1954, page 434) was dissolved in 50 ml. of absolute methanol and treated with 2 ml. of 2 N sodium methylate in methanol solution under a nitrogen atmosphere while cooling with ice. After stirring for 13 hours at room temperature, the reaction mixture was poured into ice water and then extracted with benzene to separate the neutral portion. The aqueous solution was acidified with hydrochloric acid and the acid portion was extracted with ethyl acetate. After concentration, the residue was dissolved and precipitated from ethyl acetate. There were obained 280 mg. of 4,6-dimethoxygrisan-3,2',4'-trione which was identical with the end product obtained in Example 1.

*Example 3*

500 mg. of 4,6-dimethoxygrisan-3,2',4'-trione were dissolved in 50 ml. of absolute methanol and treated at room temperature with an excess of an ether solution of diazomethane (70 ml. of 1.8% solution). After the end of nitrogen evolution, the mixture was concentrated under water vacuum and the residue was crystallized from ethyl acetate-petroleum ether. After dissolving and recrystallizing several times from ethyl acetate, there were obtained 150 mg. of 4,6,2'-trimethoxygris-2'-en-3,4'-dione, M.P. 162–163°. The U.V. spectrum in industrial alcohol showed maxima at 230, 247 and 284 m$\mu$ ($\epsilon=18,900$, $17,100$ and $25,200$) and at 317 m$\mu$ (shoulder), $\epsilon=5,200$. From the mother liquor a second isomer was obtained by concentrating and chromatographing on aluminum oxide (activity II, neutral), then eluting with benzene. After redissolving and precipitating from methanol, the product, 4,6,4'-trimethoxygris-3'-en-3,2'-dione, melted at 169-170°. The U.V. spectrum in industrial alcohol showed maxima at 263 and 284 m$\mu$ ($\epsilon=24,500$ and $26,200$) and at 317 m$\mu$ (shoulder), $\epsilon=5,000$.

*Example 4*

15 g. of 2-carbomethoxy-4,6-dimethoxycourmaran-3-one (prepared by the method in J. Chem. Soc. 1954, page 434) were dissolved in 200 ml. of methanol while warming slightly and, after cooling to 25°, was treated with 6 ml. of a 35% solution of benzyl-trimethyl-ammonium hydroxide. Then 5 g. of methyl propenyl ketone were added. After agitating for 5 hours at room temperature, the reaction mixture was cooled and filtered. There were obtained 10 g. of white crystals. After dissolving and recrystallizing from ethyl acetate-petroleum ether and finally from methanol there were obtained 1.5 g. of 2-carbomethoxy-2-(1methyl-3-oxo-n-butyl) - 4,6 - dimethoxycoumaran-3-one; M.P. 194–195°. The U.V. spectrum in industrial alcohol showed maximum of 288 m$\mu$ ($\epsilon=23,400$) and at 320 m$\mu$ (shoulder), $\epsilon=5,200$.

By concentrating the mother liquor and dissolving and crystallizing the residue from methanol there were obtained 4.5 g. of the isomer melting at 140–141°. The U.V. spectrum in industrial alcohol showed maximum at 288 m$\mu$ ($\epsilon=23,400$) and at 320 m$\mu$ (shoulder) $\epsilon=5,200$.

For the purpose of cyclizing, 3.4 g. of the isomer melting at 140–141° were dissolved in 20 ml. of warm absolute methanol and after cooling to 25° was treated with 15 ml. of a 1 N solution of sodium methylate in methanol. After agitating for 10 hours at room temperature under nitrogen atmosphere, the reaction solution was concentrated under water vacuum, diluted with water and freed of insoluble constituents by extracting with benzene. The aqueous phase was separated and decolorized with charcoal, filtered and acidified with dilute hydrochloric acid. The oil which precipitated was taken up in ethyl acetate. After concentrating the latter, crystals precipitated which were filtered and then dissolved and crystallized from methanol. There were obtained 400 mg. of 4,6-dimethoxy-6'-methylgrisan-3,2',4'-trione, M.P. 233–234°. The U.V. spectrum in industrial alcohol showed maxima at 211 and 284 m$\mu$ ($\epsilon=22,600$ and $34,000$) and at 322 m$\mu$ (shoulder), $\epsilon=5,000$. The U.V. spectrum in alcoholic 0.01 N sodium hydroxide solution showed a maximum at 287 m$\mu$ ($\epsilon=43,500$) and at 322 m$\mu$ (shoulder), $\epsilon=5,700$.

*Example 5*

19 g. of 2-carbomethoxy-4,6-dimethoxy-7-methylcoumaran-3-one were dissolved in methanol and reacted with methyl vinyl ketone in the presence of benzyl-trimethylammonium hydroxide according to the procedure described in Example 1. There were obtained 18 g. of 2-carbomethoxy-2-(3-oxo-n-butyl)-4,6-dimethoxy-7 - methyl-courmaran-3-one; M.P. 126–127°. Cyclization in methanol in the presence of sodium methylate by the procedure of Example 1 yielded 8 g. of 4,6-dimethoxy-7-methylgrisan-3,2',4'-trione, M.P. 250° (dec.). The U.V. spectrum in ethanol showed maxima at 231, 290 and 326 m$\mu$ (shoulder); $\epsilon=13,200$, $29,600$ and $5,100$. The U.V.

spectrum in 0.01 N alcoholic sodium hydroxide solution showed maxima at 230 (shoulder), 289 and 326 mμ (shoulder); ε=10,800, 42,700 and 5,100. The methylation in methanol with ethereal diazomethane solution according to the procedure of Example 3 yielded a mixture of two ethers. After crystallization from methanol there was first obtained 4,6,4'-trimethoxy-7-methylgris-3'-en-3,2'-dione; M.P. 195–196°. Its U.V. spectrum in ethanol showed maxima at 232, 260, 292 and 325 mμ (shoulder); ε=18,300, 20,900, 23,900 and 5,570.

To obtain the other isomer, the mother liquor was evaporated, the residue was treated with 0.1 M sodium carbonate solution and recrystallized from methanol. There was obtained 4,6,2'-trimethoxy-7-methylgris-2'-en-3,4'-dione melting at 205°. Its U.V. spectrum in ethanol showed maxima at 234, 250 (shoulder), 291 and 325 mμ (shoulder); ε=21,200, 16,400, 24,600 and 5,480.

The starting material, 2-carbomethoxy-4,6-dimethoxy-7-methyl-coumaran-3-one was prepared by condensing 2-hydroxy-3-methyl-4,6-dimethoxybenzoic acid methyl ester (J. Chem Soc. 1951, page 3355) with bromoacetic acid methyl ester to obtain 2-(carbomethoxy-methoxy)-3-methyl-4,6-dimethoxybenzoic acid methyl ester; B.P. 150°/0.005 mm., M.P. 145–146° (from methanol). The latter was cyclized according to the method of Dieckmann to obtain the desired 2-carbomethoxy-4,6-dimethoxy-7-methylcoumaran-3-one melting at 125–126°.

*Example 6*

24.5 g. of 2-carbomethoxy-4,6-dimethoxy-7-chlorocoumaran-3-one were dissolved in 1.8 liters of warm methanol. After cooling to room temperature, 7 ml. of a 35% solution of benzyl-trimethyl-ammonium hydroxide and 11 ml. of methyl vinyl ketone were added, and the solution was allowed to stand at room temperature for 20 hours. The solvent was then separated in vacuo and the residue was partitioned between benzene and dilute hydrochloric acid. The benzene solution was shaken with dilute sodium hydroxide solution, washed neutral and concentrated. The residue was dissolved and crystallized from methanol. There were obtained 18 g. of 2-carbomethoxy-2-(3-oxo-n-butyl)-4,6-dimethoxy-7-chlorocourmaran-3 - one, M.P. 138–139°. The U.V. spectrum in industrial alcohol showed maxima at 237, 291 and 325 mμ (ε=13,400, 21,800 and 5,300).

For the purpose of cyclizing, 10 g. of the addition product were dissolved in 500 ml. of warm absolute methanol, then treated at room temperature with 53 ml. of 1 N solution of sodium methylate in methanol and allowed to stand for 18 hours. The product was worked up as described in Example 1. The crude product obtained was dissolved and crystallized from methanol to obtain 1.3 g. of 4,6-dimethoxy-7-chlorogrisan-3,2',4'-trione; M.P. 240–241° (dec.). The U.V. spectrum in industrial alcohol showed maxima at 233, 288 and 324 mμ (ε=17,500 30,500 and 5,500). The U.V. spectrum in alcoholic 0.01 N sodium hydroxide solution showed maxima at 232, 288 and 324 mμ (ε=16,100, 47,000 and 6,100).

1.2 g. of 4,6-dimethoxy-7-chlorogrisan-3,2',4'-trione were dissolved in 230 ml. of absolute methanol and treated with an excess of an ether solution of diazomethane. At the end of nitrogen evolution, the solution was concentrated in vacuo. The residue dissolved only partially in about 20 to 30 ml. of benzene. The insoluble portion was filtered off and dissolved and crystallized from methanol. There was obtained 0.3 g. of 4,6,2'-trimethoxy-7-chlorogris-2'-en-3,4'-dione; M.P. 228–229°. The U.V. spectrum in industrial alcohol showed maxima at 236, 252, 290 and 324 mμ (ε=26,400, 17,400, 23,800 and 5,600).

The benzene soluble portion was chromatographed on aluminum oxide (activity I). The 4,6,4'-trimethoxy-7-chlorogris-3'-en-3,2'-dione was eluted with benzene. It was dissolved and crystallized from ethyl acetate. There were obtained 0.2 g. of the compound melting at 207–208°. The U.V. spectrum in industrial alcohol showed maxima at 233, 260, 289 and 324 mμ (ε=20,800, 20,400, 21,700 and 5,500).

The 2-carbomethoxy-14,6-dimethoxy-7-chlorocoumaran-3-one used as starting material was prepared as follows:

1 g. of 3-chloro-4,6-dimethoxysalicylic acid (prepared according to the method described in J. Chem. Soc. 1952, page 3975) were dissolved in 200 ml. of dimethylformamide and stirred for 14 hours at 60° with 5.0 g. of sodium bicarbonate and 5.5 ml. of dimethylsulfate. Then the solvent was removed in vacuo and the residue was treated with water. There remained undissolved 7.5 g. of crystals melting at 179–181° which were filtered off. After dissolving and crystallizing from methanol there was obtained pure 3-chloro-4,6-dimethoxysalicylic acid methyl ester, M.P. 185–186°.

The esterification was also effected in the following manner:

10 g. of 3-chloro-4,6-dimethoxysalicyclic acid were dissolved in 100 ml. of warm dimethylformamide. 80 ml. of methanol were added and the temperature was raised to 50°. Upon the addition of 10 g. of dicyclohexyl-carbodiimide the temperature rose to about 60° and immediately a mixture of dicyclohexyl urea and 3-chloro-4,6-dimethoxysalicyclic acid methyl ester crystallized out. The mixture was stirred for an additional 4 hours at room temperature, cooled to 0° and the precipitate was filtered off. From the latter the ester was obtained by dissolving in ice cold sodium hydroxide solution and precipitating with acid. There were obtained 10.5 g. of 3-chloro-4,6-dimethoxy salicylic acid methyl ester; M.P. 185–186°.

100 g. of 3-chloro-4,6-dimethoxysalicylic acid methyl ester were dissolved in 1250 ml. of warm dimethylformamide and heated with 47.5 ml. of bromoacetic acid methyl ester and 75 g. of anhydrous potassium carbonate for 22 hours at 60°. The inorganic salts were filtered off and the filtrate was concentrated in vacuo. The residue was taken up in benzene and washed with sodium hydroxide solution and then with water. After evaporating the benzene, the residue was dissolved and crystallized from isopropyl ether. There were obtained 110 to 120 g. of 2 - (carbomethoxy - methoxy) - 3 - chloro - 4,6 - dimethoxybenzoic acid methyl ester; M.P. 80–81°.

15.2 g. of sodium were added to 400 ml. of toluene and the mixture was heated at 100–105°. At this temperature there was dropped in with vigorous stirring 1 ml. of absolute methanol, then a solution of 150 g. of 2-(carbomethoxy-methoxy)-3-chloro-4,6-dimethoxybenzoic acid methyl ester in 400 ml. of toluene and the mixture was stirred for an additional 4 hours at 100°. The precipitate was filtered off and partitioned between dilute hydrochloric acid and ethyl acetate. The ethyl acetate solution was washed neutral and concentrated, then the residue was dissolved and crystallized from methanol. There were obtained 88 to 90 g. of 2-carbomethoxy-4,6-dimethoxy-7-chlorocoumaran-3-one; M.P. 146–149°.

By following the same procedure as above, the following additional products were prepared:

From 5-chloro-4,6-dimethoxysalicylic acid (J. Chem. Soc. 1952, page 3975),
first 5-chloro-4,6-dimethoxysalicylic acid methyl ester, M.P. 140°,
then 2-(carbomethoxy-methoxy)-5-chloro-4,6-dimethoxybenzoic acid methyl ester, M.P., 108°,
and 2-carbomethoxy-5-chloro-4,6-dimethoxycoumaran-3-one, M.P. 141–142°.

From 3,5-dichloro-4,6-dimethoxysalicylic acid (J. Chem. Soc. 1952, page 3975),
first 3,5-dichloro-4,6-dimethoxysalicylic acid methyl ester, M.P. 120°,
then 2-(carbomethoxy-methoxy)-3,5-dichloro-4,6-dimethoxybenzoic acid methyl ester, M.P. 88–89°, and 2-carbomethoxy-5,7-dichloro-4,6-dimethoxycoumaran-3-one, M.P. 175–176°.

Example 7

12.7 g. of 2-carbomethoxy-4,6-dimethoxy-7-chlorocoumaran-3-one (prepared as described in Example 6) were dissolved in 850 ml. of absolute methanol, then 6.35 ml. of a 35% solution of benzyltrimethyl-ammonium hydroxide and 6.35 ml. of propenyl methyl ketone were added. The mixture was stirred for 4 hours at room temperature. 2-carbomethoxy-2-(1-methyl-3-oxo-n-butyl)-4,6-dimethoxy-7-chlorocoumaran-3-one crystallized spontaneously from the reaction solution in the form of one of the two possible stereoisomeric racemates. After filtration and dissolving and crystallizing from methanol there were obtained 7.3 g. of the one stereoisomeric racemate having a melting point of 185°. From the filtrate, the second stereoisomeric racemate having a melting point of 165–167° was obtained.

36 g. of the higher melting isomer (obtained from several preparations) were cyclized by dissolving in 2.9 liters of absolute methanol and treating with 72 ml. of a 1 N solution of sodium methylate in methanol. The mixture was stirred for 17 hours at room temperature under nitrogen. Then it was concentrated at 20–30° under water vacuum. The residue was dissolved in water and the insoluble portion was extracted with benzene. The aqueous solution was then made acid to congo red by the addition of dilute hydrochloric acid. The triketone formed was then extracted with ethyl acetate. After concentrating the ethyl acetate and boiling the residue with ethyl acetate, 20 g. of racemic 4,6-dimethoxy-7-chloro-6′-methylgrisan-3,2′,4′-trione crystallized, M.P. 233–235°. The U.V. spectrum in industrial alcohol showed maxima at 230, 289 and 322 mμ (ε=18,000, 30,750 and 5,500). In alcoholic 0.1 N sodium hydroxide solution, maxima appeared at 230, 290 and 322 mμ (ε=17,000, 45,000 and 6,100).

To convert the product into the enol ether, the triketone was dissolved in 100-fold quantity of methanol and treated at 0–5° with stirring with an excess of diazomethane in ether solution. Then the mixture was concentrated under water vacuum and the residue was twice dissolved and crystallized from methanol. 4,6,2′-trimethoxy-7-chloro-6′-methylgris-2′-en-3,4′-dione (rac. epi-griseofulvin), M.P. 250–252°, was thus obtained. The U.V. spectrum in industrial alcohol showed maxima at 236, 252, 289 and 324 mμ (ε=25,500, 17,350, 23,300 and 5,560).

Example 8

Racemic epi-griseofulvin was epimerised to rac. griseofulvin by adding 3 g. of the product (prepared by the method of Example 7) to a solution of 19.5 g. of sodium in 900 ml. of methanol. The mixture was left standing on a water bath at a temperature of 80° for 3 hours. After that time the solution was concentrated in vacuo at a temperature of 20–25°. To the residue 2 l. of water were added, the solution was filtered and the residue was dried. 2.3 g. of a mixture were obtained consisting of about 40% of rac. griseofulvin and 60% of rac. epi-griseofulvin, melting at a temperature of 229–231°. The separation of the two stereoisomeric racemates was effected by chromatography on 200 parts of aluminum oxide (activity Giulini No. I). Racemic epigriseofulvin was eluted first with benzene and then racemic griseofulvin was eluted with benzene containing 4% methanol. The latter, after sublimation and recrystallization from isopropyl ether melted at 216–217°; U.V. maxima at 236, 250 (shoulder), 292 and 325 mμ (ε=23,300, 16,000, 24,900 and 5,820). The I.R. absorption spectrum in chloroform is identical to the one obtained from natural d-griseofulvin.

Example 9

500 mg. of 2-carbomethoxy-4,6-dimethoxycoumaran-3-one (prepared by the method in J. Chem. Soc. 1954, page 434) were dissolved in 40 ml. of absolute methanol and treated with 1 ml. of a 2.1 N solution of sodium methylate in methanol. Then 0.17 ml. of methyl vinyl ketone were rapidly dropped into the mixture and it was stirred for 21 hours at room temperature. The reaction mixture was evaporated to dryness in vacuo and the residue was partitioned between benzene and water. After separating the benzene layer, which contained the neutral portion, the aqueous phase was made acid by the addition of dilute hydrochloric acid. From the acid solution 140 mg. of 4,6-dimethoxygrisan-3,2′,4′-trione were isolated, which was identical with the end product obtained in Example 1.

We claim:
1. A process which comprises reacting a compound of the formula

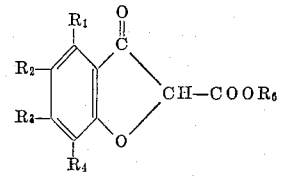

wherein $R_1$, $R_2$, $R_3$ and $R_4$ each represents a member of the group consisting of hydrogen, lower alkyl, lower alkoxy, hydroxy, nitro and halogen and $R_6$ represents lower alkyl, with an alkenyl methyl ketone of the formula

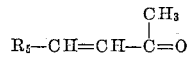

wherein $R_5$ represents lower alkyl,
in alkaline medium to produce a compound of the formula

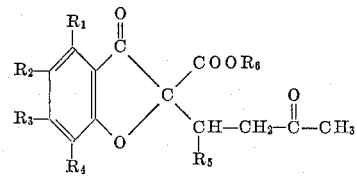

wherein $R_1$ to $R_6$ have the same meaning as above, cyclizing the last named addition product in an inert solvent by means of an alkaline cyclizing agent selected from the group consisting of alkali metals, alkali metal alcoholates, and alkali metal hydrides to produce a triketone of the formula

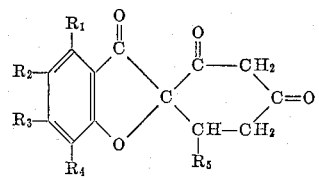

wherein $R_1$ to $R_5$ have the same meaning as above, reacting the last named compound with a member of the group consisting of lower alkylating agent and lower acylating agent to produce a compound selected from the group consisting of

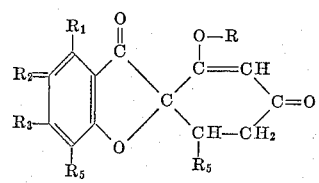

and

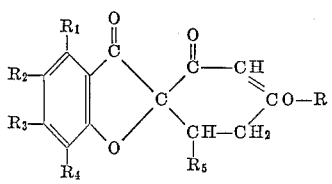

wherein $R_1$ to $R_5$ have the same meaning as above and R represents a member of the group consisting of lower alkyl and lower alkanoyl, and epimerising the last named product with alkali.

2. A process as in claim 1 wherein the alkaline medium is benzyl-trimethyl-ammonium hydroxide.

3. A process which comprises reacting 2-carbomethoxy-4,6-dimethoxy-7-chlorocoumaran-3-one with propenyl methyl ketone in alkaline medium to produce 2-carbomethoxy - 2 - (1-methyl-3-oxo-n-butyl)-4,6-dimethoxy-7-chlorocoumaran-3-one, cyclizing the last named product in an inert solvent by means of alkali metal alcoholate to produce 4,6-dimethoxy-7-chloro-6'-methylgrisan-3,2',4'-trione and reacting the last named product with a methylating agent to obtain 4,6,2'-trimethoxy-7-chloro-6'-methylgris-2'-en-3,4'-dione and epimerising the product with alkali.

4. A process which comprises reacting a compound of the formula

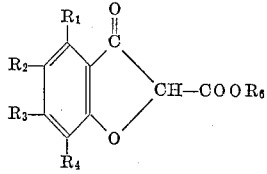

wherein $R_1$, $R_2$, $R_3$ and $R_4$ each represents a member of the group consisting of hydrogen, lower alkyl, lower alkoxy, hydroxy, nitro and halogen and $R_6$ represents lower alkyl, with an alkenyl methyl ketone of the formula

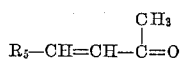

wherein $R_5$ represents lower alkyl, in alkaline medium to produce a compound of the formula

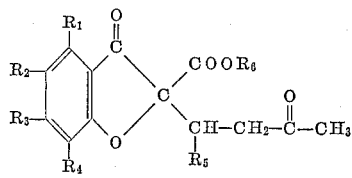

wherein $R_1$ to $R_6$ have the same meaning as above, and cyclizing the last named addition product in an inert solvent by means of an alkaline cyclizing agent selected from the group consisting of alkali metals, alkali metal alcoholates, and alkali metal hydrides to produce a triketone of the formula

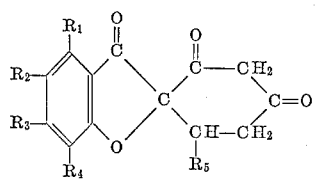

wherein $R_1$ to $R_5$ have the same meaning as above.

5. A process which comprises reacting 2-carbomethoxy-4,6-dimethoxy-7-chlorocoumaran-3-one with propenyl methyl ketone in alkaline medium to produce 2-carbomethoxy - 2 - (1-methyl-3-oxo-n-butyl)-4,6-dimethoxy-7-chlorocoumaran-3-one and cyclizing the last named product in an inert solvent by means of alkali metal alcoholate to produce 4,6-dimethoxy-7-chloro-6'-methylgrisan-3,2',4'-trione.

6. A process which comprises reacting 2-carbomethoxy-4,6-dimethoxycoumaran-3-one with methyl vinyl ketone in alkaline medium to produce 2-carbomethoxy-2-(3-oxo-n-butyl)-4,6-dimethoxycoumaran-3-one and cyclizing the last named product in an inert solvent by means of alkali metal alcoholate to produce 4,6-dimethoxygrisan-3,2',4'-trione.

7. A process which comprises reacting 2-carbomethoxy-4,6-dimethoxycoumaran-3-one with methyl propenyl ketone in alkaline medium to produce 2-carbomethoxy-2-(1 - methyl-3-oxo-n-butyl)-4,6-dimethoxycoumaran-3-one and cyclizing the last named product in an inert solvent by means of alkali metal alcoholate to produce 4,6-dimethoxy-6'-methylgrisan-3,2',4'-trione.

8. A process which comprises reacting 2-carbomethoxy-4,6-dimethoxy-7-chlorocoumaran-3-one with methyl vinyl ketone in alkaline medium to produce 2-carbomethoxy-2 - (3 - oxo-n-butyl)-4,6-dimethoxy-7-chlorocoumaran-3-one and cyclizing the last named product in an inert solvent by means of alkali metal alcoholate to produce 4,6-dimethoxy-7-chlorogrisan-3,2',4'-trione.

9. A process which comprises cyclizing a compound having the formula

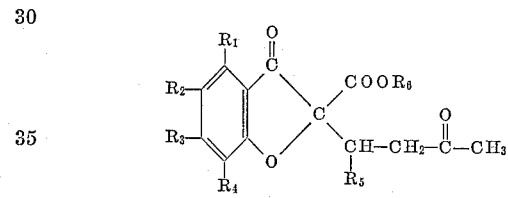

wherein $R_1$, $R_2$, $R_3$ and $R_4$ each represents a member of the group consisting of hydrogen, lower alkyl, lower alkoxy, hydroxy, nitro and halogen and $R_5$ and $R_6$ each represents lower alkyl, in an inert solvent by means of an alkaline cyclizing agent selected from the group consisting of alkali metals, alkali metal alcoholates, and alkali metal hydrides to produce a triketone of the formula

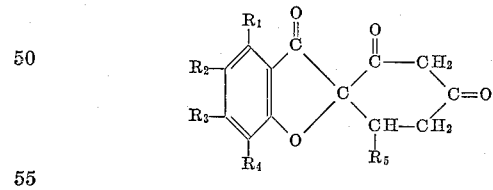

wherein $R_1$ to $R_5$ have the same meaning as above.

10. A process which comprises cyclizing 2-carbomethoxy - 2-(1-methyl-3-oxo-n-butyl)-4,6-dimethoxy-7-chlorocoumaran-3-one in an inert solvent by means of alkali metal alcoholate to produce 4,6-dimethoxy-7-chloro-6'-methylgrisan-3,2',4'-trione.

11. A process which comprises cyclizing 2-carbomethoxy - 2-(3-oxo-n-butyl)-4,6-dimethoxycoumaran-3-one in an inert solvent by means of alkali metal alcoholate to produce 4,6-dimethoxygrisan-3,2',4'-trione.

12. A process which comprises cyclizing 2-carbomethoxy - 2-(1-methyl-3-oxo-n-butyl)-4,6-dimethoxycoumaran-3-one in an inert solvent by means of alkali metal alcoholate to produce 4,6-dimethoxy-6'-methylgrisan-3,2',4'-trione.

13. A process which comprises cyclizing 2-carbomethoxy - 2-(3-oxo-n-butyl)-4,6-dimethoxy-7-chlorocoumaran-3-one in an inert solvent by means of alkali metal alcoholate to produce 4,6-dimethoxy-7-chlorogrisan-3,2',4'-trione.

14. A process which comprises cyclizing a compound having the formula

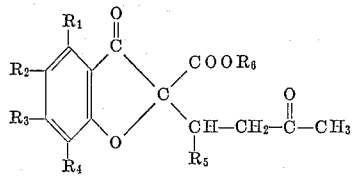

wherein $R_1$, $R_2$, $R_3$ and $R_4$ each represents a member of the group consisting of hydrogen, lower alkyl, lower alkoxy, hydroxy, nitro and halogen and $R_5$ and $R_6$ each represents lower alkyl, in an inert solvent by means of an alkaline cyclizing agent selected from the group consisting of alkali metals, alkali metal alcoholates, and alkali metal hydrides to produce a triketone of the formula

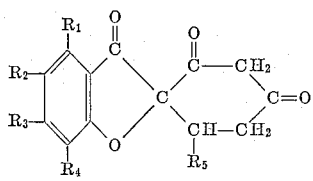

wherein $R_1$ to $R_5$ have the same meaning as above, and reacting said triketone with a lower alkylating agent to produce a compound selected from the group consisting of

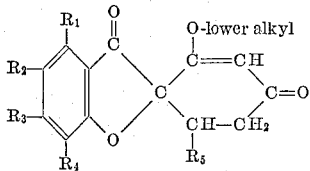

and

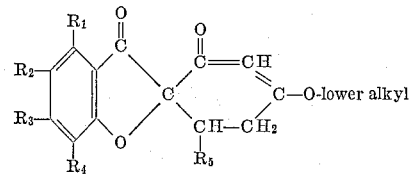

wherein $R_1$ to $R_5$ have the same meaning as above.

15. A process which comprises cyclizing 2-carbomethoxy - 2-(1-methyl-3-oxo-n-butyl)-4,6-dimethoxy-7-chlorocoumaran-3-one in an inert solvent by means of alkali metal alcoholate to produce 4,6-dimethoxy-7-chloro-6'-methylgrisan-3,2',4'-trione and methylating the last named product with diazomethane to produce 4,6,2'-trimethoxy-7-chloro-6'-methylgris-2'-en-3,4'-dione.

16. A process which comprises cyclizing 2-carbomethoxy - 2-(3-oxo-n-butyl)-4,6-dimethoxycoumaran-3-one in an inert solvent by means of alkali metal alcoholate to produce 4,6-dimethoxygrisan-3,2',4'-trione and methylating the last named product with diazomethane to produce a compound selected from the group consisting of 4,6,2'-trimethoxygris-2'-en-3,4'-dione and 4,6,4'-trimethoxygris-3'-en-3,2'-dione.

17. A process which comprises cyclizing 2-carbomethoxy - 2-(3-oxo-n-butyl)-4,6-dimethoxy-7-chlorocoumaran-3-one in an inert solvent by means of alkali metal alcoholate to produce 4,6-dimethoxy-7-chlorogrisan-3,2',4'-trione and methylating the last named product with diazomethane to produce a compound selected from the group consisting of 4,6,2'-trimethoxy-7-chlorogris-2'-en-3,4'-dione and 4,6,4'-trimethoxy-7-chlorogris-3'-en-3,2'-dione.

References Cited in the file of this patent

Henecka: Chem. Ber., volume 81 (1948), pages 197–209 at pages 203 and 207–8.

MacMillan et al.: J. Chem. Soc., London (1954), pages 429–35.

Migrdichian: Organic Synthesis, volume 1 (1957), pages 345–6.

MacMillan: J. Chem. Soc., London (1959), pages 1823–29.

Eliel: Sterochemistry of Carbon Compounds (1962), page 39.